United States Patent [19]
Dennis et al.

[11] Patent Number: 5,029,735
[45] Date of Patent: Jul. 9, 1991

[54] PORTIONING APPARATUS

[75] Inventors: Wendell E. Dennis, Overland Park; M. Dale Cain, Olathe, both of Kans.

[73] Assignee: Marlen Research Corporation, Overland Park, Kans.

[21] Appl. No.: 409,684

[22] Filed: Sep. 20, 1989

[51] Int. Cl.$^5$ .............................................. B67D 5/00
[52] U.S. Cl. ..................................... 222/255; 222/148
[58] Field of Search ............... 222/148, 334, 309, 276, 222/267, 185, 363, 452, 504, 542, 548, 255

[56] References Cited

U.S. PATENT DOCUMENTS

| | | | |
|---|---|---|---|
| 2,761,605 | 9/1956 | Pahl et al. | 222/309 |
| 2,998,037 | 8/1961 | Bingham | 222/452 |
| 3,899,019 | 8/1975 | Langne | 222/148 |
| 4,445,629 | 5/1984 | Doerfler | 222/148 |
| 4,684,040 | 8/1987 | Jonovic et al. | 222/148 |

OTHER PUBLICATIONS

Ham Portioning Unit, VEMAG Type 660.

Primary Examiner—Michael S. Huppert
Assistant Examiner—Pomrening Anthoula
Attorney, Agent, or Firm—Hovey, William, Timmons & Collins

[57] ABSTRACT

An improved turret-type portioning apparatus (10) is provided which includes a selectively pivotal portioning assembly (14) for moving a pair of upright product-receiving cylinders (84, 86) between a fill position for receiving product and a discharge position for discharge of accurately sized portions. Cleanout of the apparatus (10) is facilitated by means of a selectively actuatable piston and cylinder assembly (158) which operates to elevate the portioning assembly (14) away from an underlying frame assembly (12). Operational control for the apparatus (10) is achieved by means of pneumatic control circuitry (18).

2 Claims, 6 Drawing Sheets

PORTIONING APPARATUS

BACKGROUND OF THE INVENTION

1. Field of the Invention

The present invention is broadly concerned with a turret-type portioning apparatus adapted to be coupled with a food pump and operable to produce individual portions of controlled, consistent selected portion weight. More particularly, it is concerned with such a portioner which is especially adapted to deliver accurate portions to conventional form, fill and seal packaging equipment, and which is characterized by a unique turret design which can be elevated away from an underlying frame so as to facilitate cleanout of the apparatus.

2. Description of the Prior Art

A wide variety of portioning devices have been proposed in the past for creating successive, accurately sized portions of flowable products such as meat, and for delivering such portions to downstream handling or packaging equipment. A persistent problem with prior portioners stems from the fact that they give unequal and inconsistent portion weights over time, thereby creating short or excessive weights in the final packages. In addition, food portioning apparatus of this type must be frequently cleaned, and many prior portioners are difficult to break down and clean on a regular basis.

One known portioning device described as "Ham Portioning Unit Type 660" has been commercialized for several years by Vemag Verdener Maschinen-Und Apparatebau GmbH of West Germany. This machine is specifically designed for portioning of meat products and delivery thereof into underlying formed, fill and seal packaging equipment. Although commercially available, this type of portioner is prone to the problems described previously, i.e., unequal portion weights and cleanout difficulties.

The Vemag unit includes a dual portioning cylinder turret assembly which is shifted between an inlet position for receiving meat to be portioned, and an outlet or discharge position wherein respective portions are delivered to an underlying form, fill and seal packaging device. A brochure describing this portioner and entitled "Ham Portioning Unit Type 660" is incorporated by reference herein.

SUMMARY OF THE INVENTION

The present invention provides an improved turret-type portioner which is specifically designed to overcome the problems of the prior art, insofar as unequal portion weights and cleanout difficulties are concerned. To this end, the portioning apparatus of the invention includes a frame assembly presenting a product inlet and a portion outlet, and together with at least one portioning assembly including a portioning member for receiving product, and means for ejecting selected quantity product portions from the member. The portioning assembly is mounted adjacent a frame for selective movement between a fill position wherein the portioning member communicates with the inlet, and a discharge position where the member communicates with the outlet. Cleanout apparatus including the motive means is operatively coupled with the frame and portioning assemblies for selective separation thereof upon actuation of the motive means, in order to permit quick, easy, cleaning of the assemblies.

In preferred forms, the frame assembly is fixed and is positioned below the portioning assembly, with the latter comprising a pair of upright, side-by-side tubular cylinders each including a shiftable, internal piston. The portioning assembly is in the form of a turret which can be rotated via a pneumatically actuated crank assembly between the fill and discharge positions.

The cleanout apparatus preferably includes an elongated, upright shaft fixedly secured to the frame assembly, together with a piston and cylinder assembly coupled with the portioning assembly and presenting a downwardly extending piston rod. A reversible sleeve is provided for selectively coupling the piston and frame shaft so that, upon downward extension of the piston rod, the entire portioning assembly is elevated relative to the underlying frame.

The portioner of the present invention has been shown to give extremely consistent portion weights over time, particularly when a twin-piston food pump of the type commercialized by Marlen Research Corporation of Overland Park, Kansas is used to feed the portioner. Typically, consistencies are achieved which are no more than about plus or minus 0.2 percent from the desired nominal portion weight.

DESCRIPTION OF THE PREFERRED EMBODIMENT

Figure 1:
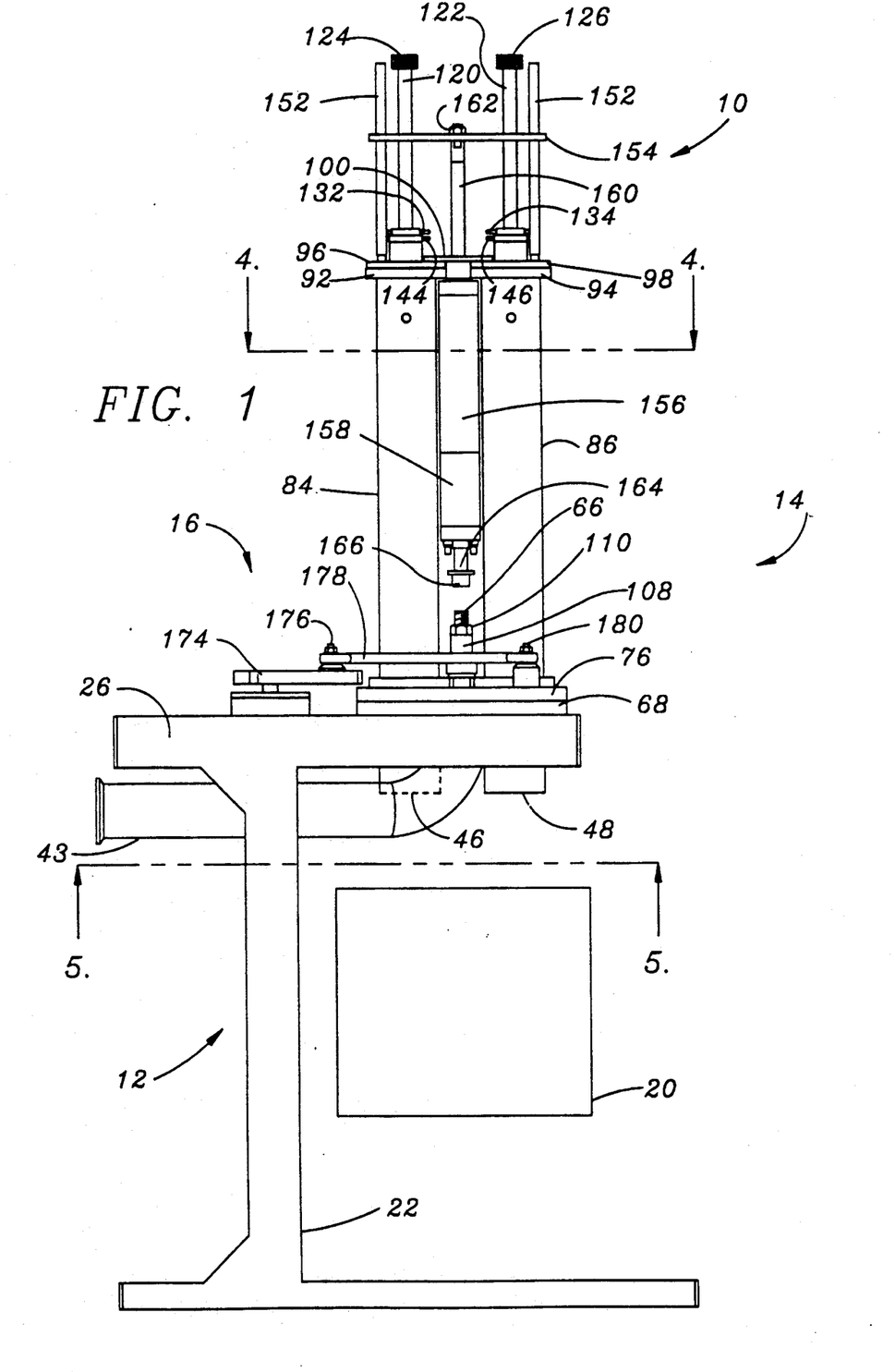
FIG. 1 is a front elevational view of a portioning device in accordance with the present invention, shown in relationship to the filling station of a form, fill and seal packaging device.

Turning now to the drawings, and particularly FIG. 1, a portioner apparatus 10 is illustrated. Broadly speaking, the apparatus 10 includes a stationary, lower frame assembly 12, an upper, dual-cylinder portioning assembly 14, and pivot apparatus 16 for selective pivoting of assembly 14 between the operative positions thereof. In addition, the overall apparatus 10 includes a pneumatic control assembly 18 (FIG. 9) which governs the sequential operation of the apparatus.

As illustrated in FIG. 1, the portioner apparatus 10 is situated adjacent the filling station 20 of a conventional form, fill and seal packaging device; as will be appreciated by those skilled in the art, the apparatus 10 is designed to sequentially deliver formed portions of product to filling station 20, whereby to assist in the automated formation of complete, sealed portion packages.

In more detail, the frame assembly 12 includes a pair of spaced apart, ground-engaging generally L-shaped legs 22, 24 which support, at their upper ends, a pair of fore and aft extending side frame members 26, 28. The latter are interconnected by means of a transverse box beam 30, and by means of an apertured, metallic frame plate 32. The plate 32 is provided with a central aperture 34, a pair of spaced apart outlet openings 36, 38, and a pair of spaced inlet openings 40, 42. The opening pairs 36, 38 and 40, 42 are arranged in transverse relationship with each other for purposes to be made clear.

A Y-shaped, bifurcated product inlet conduit 43 is affixed to plate 32 in registry with the inlet openings 40, 42, for delivery of product to such inlet openings. A pump (not shown) is adapted to be coupled to the end of conduit 43 remote from plate 32.

Figure 7:
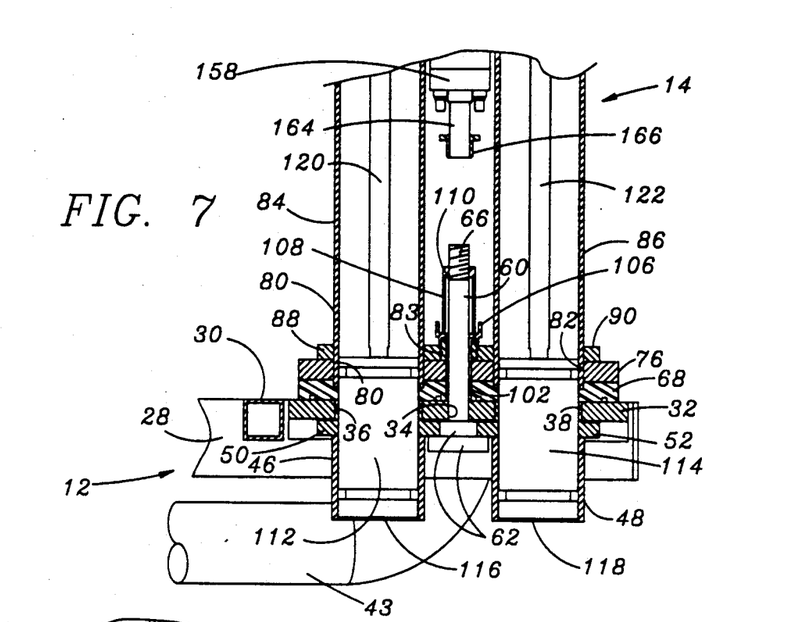
FIG. 7 is a fragmentary, vertical sectional view of the frame and portioning assemblies, shown during use of the apparatus.
Figure 8:
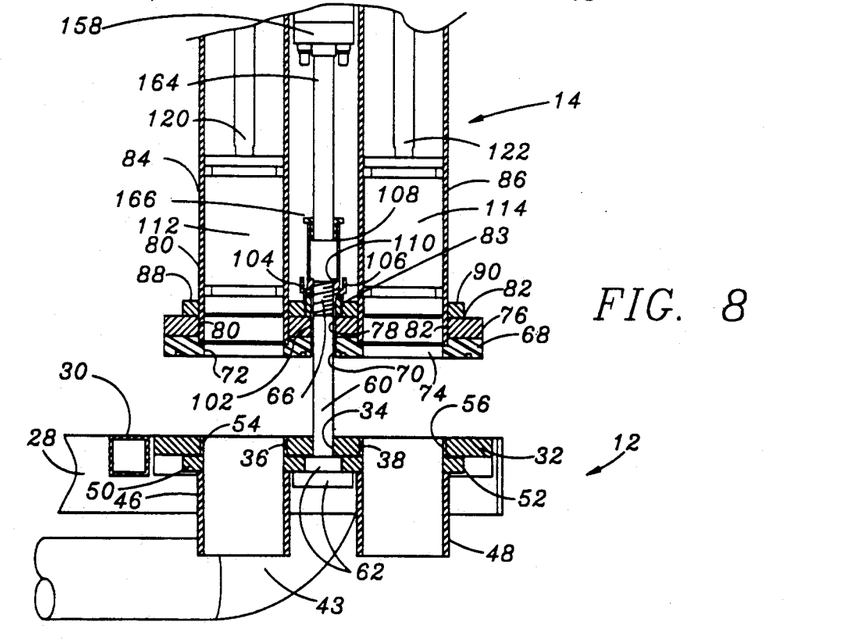
FIG. 8 is a view similar to that of FIG. 7, but showing the portioner assembly in its elevated, cleanout position.

A pair of outlet tubes 46, 48 are respectively secured in registry with the corresponding outlet openings 36, 38. Each of the tubes 46, 48 includes, adjacent its upper end, a flange 50, 52 as well as a short, upwardly extending bushing portion 54, 56. As best seen in FIGS. 7 and 8, the respective bushing portions 54, 56 fit within the outlet openings 36, 38, whereas bolts 58, passing through the flanges 50, 52, serve to secure the outlet tubes 46, 48 in place.

Figure 5:
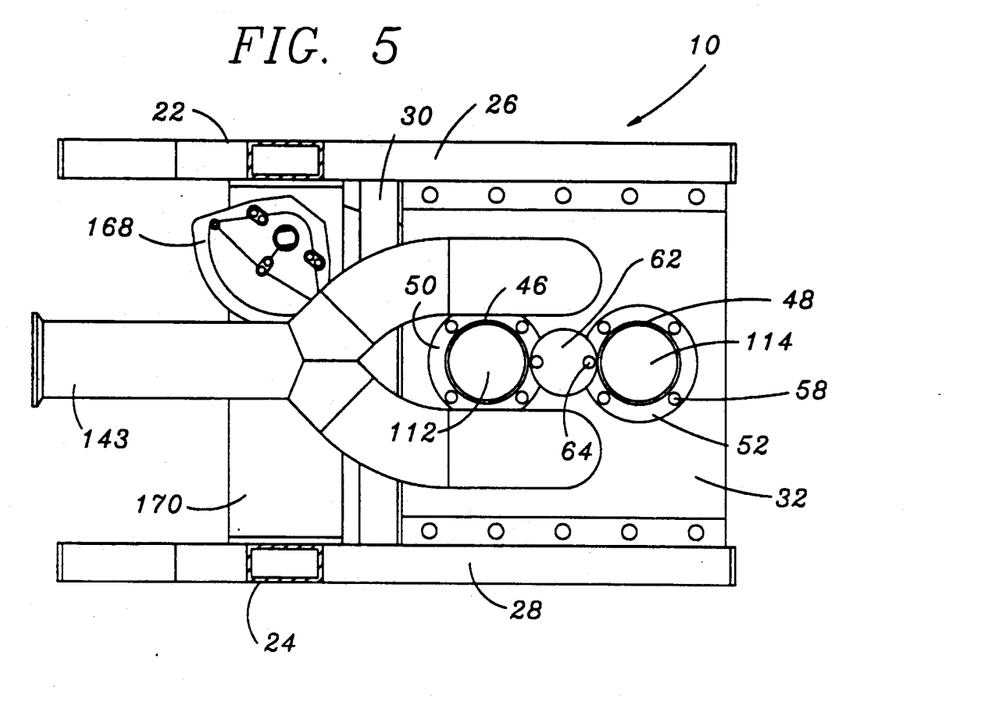
FIG. 5 is a sectional view taken along the line of 5—5 of FIG. 1.

The lower frame assembly 12 is also provided with an upstanding, central fixed shaft 60 which extends through central plate opening 34 and is secured in place by means of stepped connector blocks 62 and bolts 64 which extend through the larger diameter connection block and into the adjacent flange 50 or 52 (see FIG. 5). The uppermost end of shaft 60 is threaded as at 66, for purposes to be described.

Portioning assembly 14 includes a lowermost, apertured, synthetic resin (Delrin) plate 68 presenting a central opening 70 therethrough, as well as a pair of spaced cylinder apertures 72, 74. A pair of circular sealing rings (not shown) are situated within the ring grooves provided in the lower face of plate 68. The plate 68 is surmounted by a stainless steel plate 76 likewise presenting a central opening 78 and a pair of spaced cylinder-receiving apertures 80, 82 therethrough; as will be seen from a study of FIGS. 7 and 8, the openings 70, 78 and apertures 72, 80 and 74, 82 are in registry. In addition, the plate 76 has an upstanding, tubular boss 83 surrounding central opening 78.

A pair of upright, tubular meat-receiving cylinders 84, 86 are respectively situated within the mated apertures 72, 80 and 74, 82, and extend upwardly from metallic plate 76. The respective cylinders 84, 86 are secured in place by means of lower integral flanges 88, 90 which are bolted to plate 76. The upper end of each of the cylinders is likewise provided with an integral, circumscribing flange 92, 94, and respective annular caps 96, 98 are bolted to the underlying flanges 92, 94. Each of the caps 96, 98 includes an upstanding, tubular, internally threaded segment 96a, 98a. In addition, an oblong, centrally apertured connector plate 100 spans and is connected to the caps 96, 98.

An elongated, tubular sleeve 102 is positioned within the mated central openings 70, 78 in the plates 68, 76. The upper end of sleeve 102 is provided with a depending, circumscribing lip 104 abutting the upper end of boss 83, as well as an upwardly opening, cup-like fitting 106. A suitable thrust bearing (not shown) is interposed between fitting 106 and boss 83. An upper cap sleeve 108 presenting a threaded uppermost end 110 is also provided, and during normal portioning operations is situated as illustrated in FIG. 7. Specifically, during the normal operation of apparatus 10 described in further detail hereinafter, the shaft 60 forming a part of lower frame assembly 12 extends upwardly through sleeve 102, with cap sleeve 108 being threaded onto the end 66 of the shaft 60; this serves to press plate 68 into sealing engagement with main plate 32 of frame assembly 12.

Each of the cylinders 84, 86 includes a shiftable piston 112, 114 therein. Each of these pistons includes a product-engaging face 116, 118, as well as an upwardly extending piston rod 120, 122 secured to the opposite face of the piston. The rods as shown extend upwardly through the annular caps 96, 98, and have enlarged, uppermost heads 124, 126 Precise adjustment of the respective pistons 112, 114 is provided by means of a tubular, externally threaded body 128, 130 situated within and in threaded interengagement with a corresponding body 96a, 98a; each body 128, 130 includes an interconnected, uppermost handwheel 132, 134, as well as a depending piston-engaging section 136, 138 respectively secured to corresponding rings 140, 142 adopted to abut the uppermost faces of the pistons 112, 114. Locknuts 144, 146 are in threaded engagement with the bodies 128, 130 between the segments 96a, 98a and the corresponding handwheels 132, 134.

Each of the cylinders 84, 86, includes an uppermost, annular, synthetic resin bushing 148, 150 which is situated directly beneath the corresponding cap 96, 98 and engages a section 136, 138.

Figure 6:
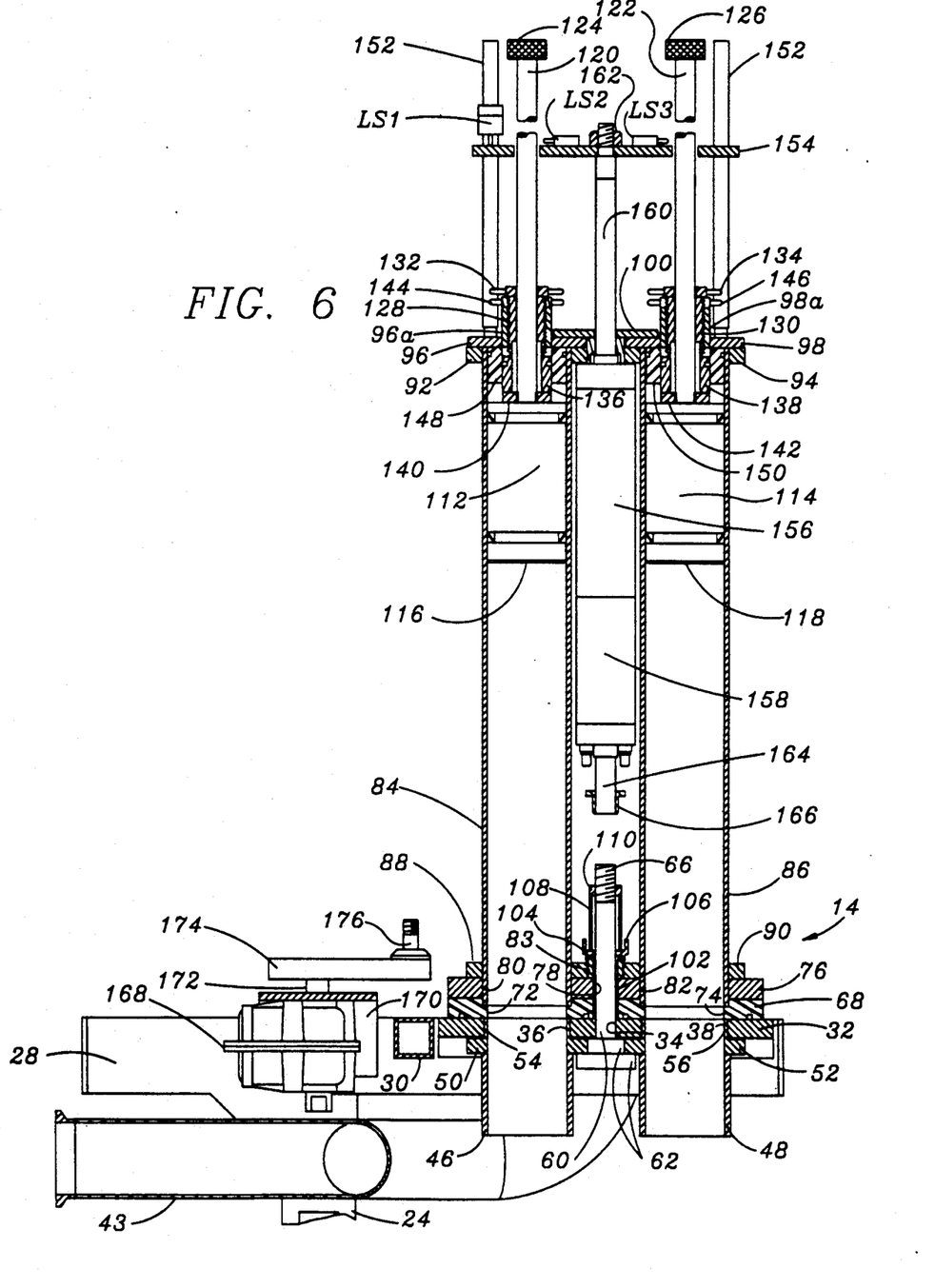
FIG. 6 is a vertical sectional view of the apparatus, showing the portioner cylinder pistons in their elevated position.

A total of four upstanding guide rods 152 are connected to and extend upwardly from the caps 96, 98 (two rods per cap). One of these rods (see FIG. 6) affixed to cap 96 is provided with a limit switch LS1 for purposes to be described. An apertured, oblong top plate 154 provided with openings to slidably receive the respective guide rods 152 as well as piston rods 120, 122. The plate is further equipped with a pair of limit switches, LS2 and LS3, respectively adapted for engagement with a piston rod head 124, 126 during operation of apparatus 10.

A pair of interconnected, oppositely extending piston and cylinder assemblies, namely an upper piston lift assembly 156 and a cleanout assembly 158, are mounted between the cylinders 84, 86. Specifically, the upper assembly 156 is secured to the caps 96, 98 by conventional means, and includes an upwardly extending piston rod 160 which passes through the central opening in connector plate 100 and is coupled via nut 162 to plate 154. The lower cleanout assembly 158 includes an outwardly and downwardly extending piston rod 164 equipped with a lowermost fitting 166.

Pivot apparatus 16 is adapted to rotate portioning assembly 14 in a manner to be described hereinafter. The apparatus 16 includes a pneumatically driven pivot operator 168 which is secured to a transversely extending plate 170 secured between the side frame members 26, 28. The operator 168 further includes an upwardly extending shaft 172 which extends through plate 170; an oblong pivot plate 174 is secured to the shaft 172 above plate 170 (see FIG. 6), and includes an upstanding threaded stud 176. A crank arm 178 is operatively secured to threaded stud 176 and is likewise pivotally connected to plate 76 by means of a conventional connector 180. Actuation of operator 168 to selectively and alternately pivot portioning assembly 14 between an inlet position wherein the cylinders 84, 86 communicate with inlet openings 40, 42, and a discharge position wherein the cylinders communicate with the outlet tubes 46, 48.

Figure 2:
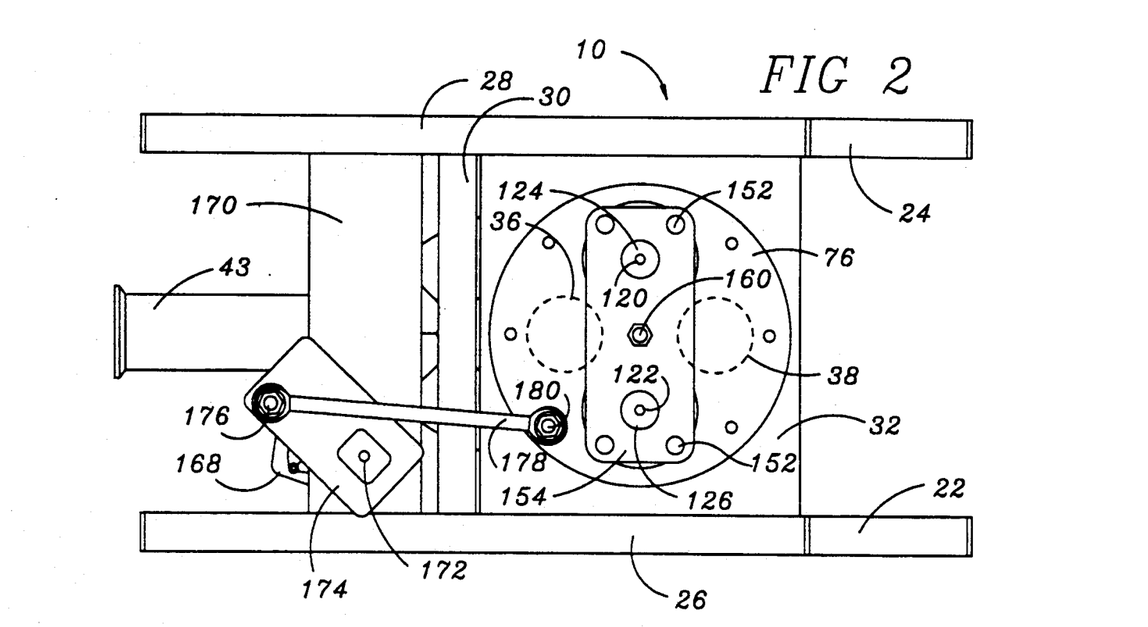
FIG. 2 is a plan view of the preferred portioning device, with the turret shown in the inlet or filling position thereof.
Figure 3:
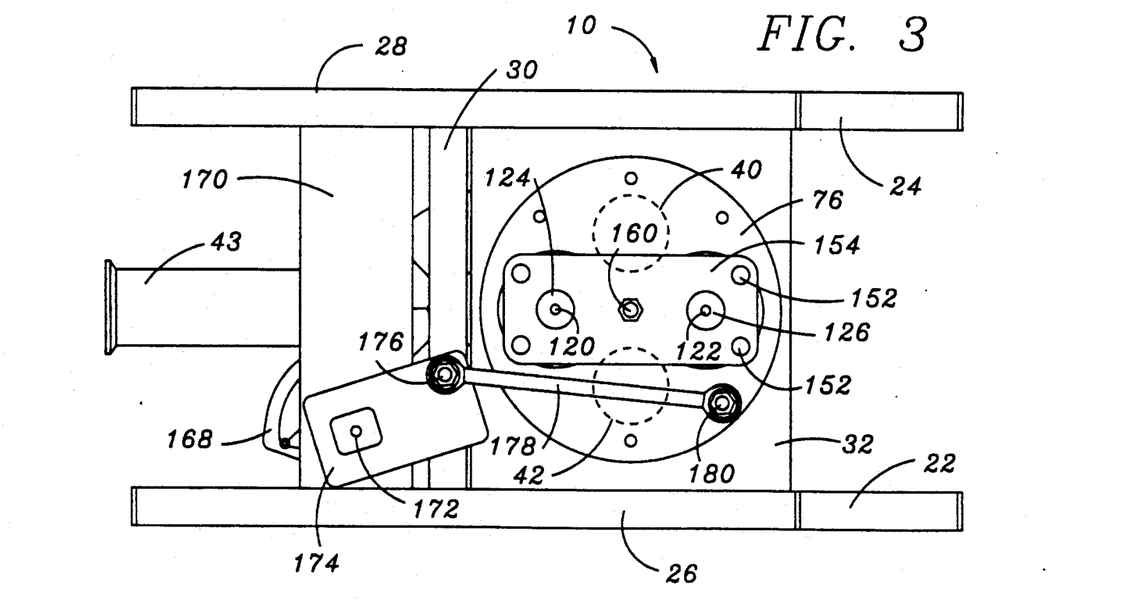
FIG. 3 is a plan view similar to that of FIG. 2, but illustrating the turret in its discharge position.
Figure 4:
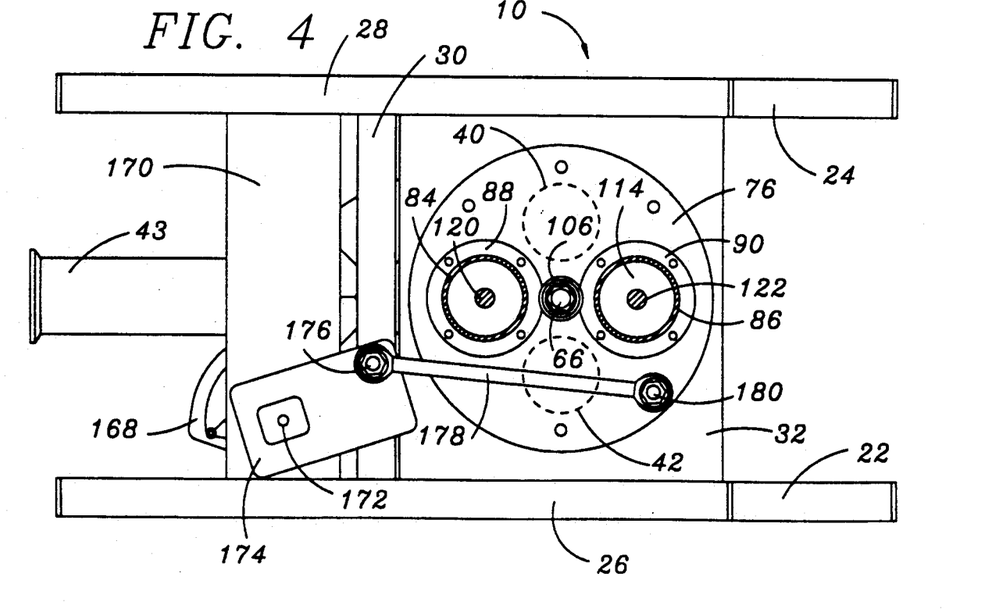
FIG. 4 is a sectional view taken along the line of 4—4 of FIG. 1.

In general, during the operation of apparatus 10, a flowable product such as meat is fed via conduit 43 to the portioning assembly. At the outset, the portioning assembly is in the position shown in FIG. 2, i.e., the cylinders 84, 86 communicate with inlet openings 40, 42. Therefore, the meat or other product, under positive pressure, feeds upwardly into the respective cylinders 84, 86, to a predetermined extent set through the control mechanism of the apparatus. This serves to elevate the pistons 112, 114. When the cylinders are so filled, the control mechanism 18, through operator 168, rotates the portioning assembly 14 to the FIG. 3 position thereof, with the cylinders 84, 86 then being in communication with outlet tubes 46, 48.

At this point, the respective piston 112, 114 are driven downwardly to eject the respective product portions from the cylinders and out the outlet tubes 46, 48. In so doing, the pistons descend to the position illustrated in FIG. 7, i.e., until they are substantially flush with the bottom edges of the tubes 46, 48.

In the next step, the pistons 112, 114 are elevated sufficiently to permit reverse pivoting of the portioning assembly 14. Such elevation is effected by means of piston and cylinder assembly 156 acting to elevate plate 154 and, by virtue of engagement thereof with the piston rod heads 124, 126, to likewise elevate the internal pistons themselves. Thereupon, the operator 168 is again actuated to pivot the portioning assembly 14 back to its inlet position, so that the cycle may be repeated.

When it is desired to clean apparatus 10, the filling operation is of course stopped, and cap sleeve 108 is unthreaded from end 66 of shaft 60. The cap sleeve is then inverted and rethreaded onto the section 66, thereby assuming the position depicted in FIG. 8. Next, the piston and cylinder assembly 158 is actuated to shift rod 164 downwardly until fitting 166 comes into mating engagement with the open end of cap sleeve 108. Further downward movement of the rod 164 thereby serves to elevate the entire portioning assembly 14 above the frame assembly 12, again as shown in FIG. 8. In this position, the respective assemblies may be readily cleaned without the need for otherwise breaking down the apparatus.

When apparatus 10 is initially set up for a desired portion weight, an appropriately sized annular spacer is positioned on each piston rod 120, 122, resting directly atop the upper surfaces of the pistons 112, 114. These serve as limit stops to prevent elevation of the pistons 112, 114 during the filling cycle above a predetermined level (which would of course give overweight portions). Fine adjustment may then be made by loosening locknuts 144, 146, adjusting with handwheels 132, 134, and retightening the locknuts. This assures very accurate portion weights. Obviously, when it is desired to change portion weights, differently sized spacers (or none at all if maximum portion weight is desired) are employed.

Figure 9:
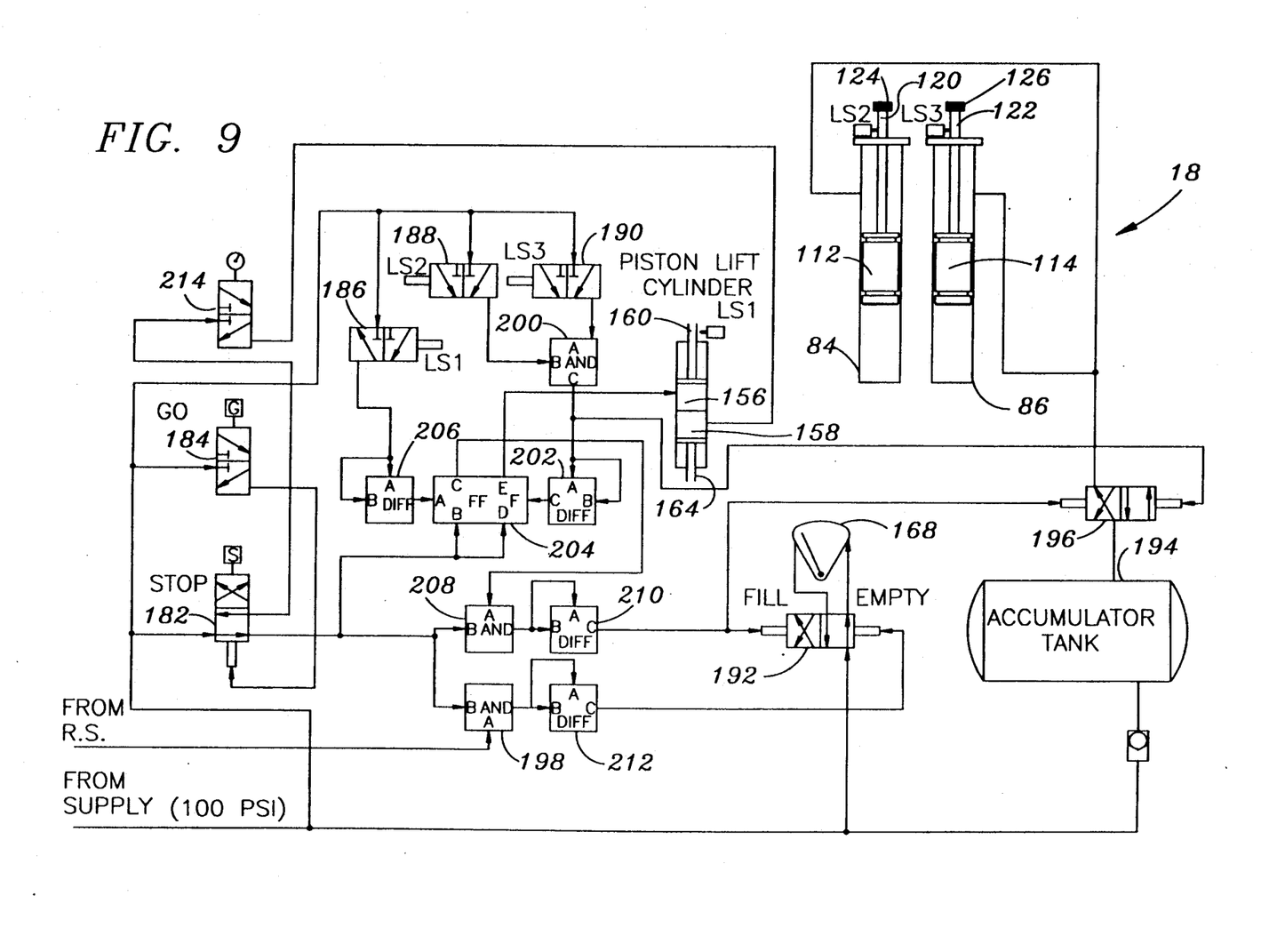
FIG. 9 is a schematic representation of the preferred pneumatic control for the portioner apparatus.

Attention is next directed to FIG. 9 which depicts in schematic form the pneumatic control assembly 18. Such control apparatus is designed to control the portioning and cleanout operations of apparatus 10, in the manner previously described.

In particular, supply air (100 p.s.i.) is provided to "STOP" valve 182, "GO" valve 184, piston lift valve 186, left piston valve 188, right piston valve 190, pivot operator valve 192 and accumulator tank 194 which in turn supplies meat piston valve 196. The form, fill and seal machine supplied by portioner apparatus 10 hereof provides an index signal indicative that additional, portioned meat is required. This signal is intermittently supplied to AND valve 198.

As meat or other product is supplied to the form, fill and seal machine, piston heads 124, 126 shift downwardly until, at the bottom of the stroke, limit switches LS2 and LS3 are actuated. This in turn actuates valves 188, 190 to supply an air signal to AND valve 200. When AND valve 200 receives the signal from both the valves 188, 190, it provides an output signal to differential unit 202 and to the right side pilot of meat piston valve 196 which immediately shifts to relieve the air pressure from pistons 112, 114.

The output from AND valve 200 is supplied to both terminals A and B of differential unit 202 which immediately supplies an output to terminal F of pneumatic flip-flop 204. Differential unit 202 is so constructed that an internal orifice and chamber coupled with terminal B provides a time delay such that after the predetermined time delay, the output from terminal C goes off.

The input signal at flip-flop terminal F causes supply air received at terminal D to be supplied as output to terminal E to piston lift assembly 156. This in turn causes the piston rod 160 to elevate the two meat piston units. When the proper elevation is achieved to clear the stationary frame assembly 12, limit switch LS1 is actuated which in turn actuates piston lift valve 186 to supply output to differential unit 206. The output from differential unit 206 is supplied to terminal A of flip-flop 204 which in turn causes an output signal from terminal C thereof to terminal A of AND valve 208.

The input to terminal B of AND valve 208 is supplied from STOP valve 182 which is actuated to the position shown in FIG. 9 when supplied with a pneumatic signal from GO valve 184. Manual actuation of STOP valve 182 prevents operation of both AND valves 208 and 198. GO valve 184 is manually actuated to supply the pneumatic signal to STOP valve 182. The output from STOP valve 182 also supplies flip-flop terminals B and D.

Receipt of a pneumatic signal at both terminals A and B of AND valve 208 results in an output signal which is supplied to terminals A and B of differential unit 210 which in turn provides an output from terminal C thereof. As with differential units 202, 206, the output from differential 210 goes off after a predetermined time delay. The output from differential 210 is supplied to the left side pilot of pivot operator valve 192 and to the left side pilot of meat piston valve 196. Upon receipt of the signal from differential unit 210, pivot operator valve 192 operates to shift pivot operator 168 to the "fill" position. At the same time, meat piston valve 196 shifts to supply positive pressure air to the upper portions of cylinders 84, 86 and thereby to the upper surfaces of pistons 112, 114 in order to shift them downwardly and supply the meat to the form, fill and seal machine.

The unit remains in the fill position until the indexing signal (R.S.) is received from the form, fill and seal machine at terminal A of AND valve 198 which receives its other input from STOP valve 182. Upon receipt of the index signal, AND valve 198 provides an output to both terminals A and B of differential unit 212 which in turn provides a timed output to the right side pilot of pivot operator valve 192 which then provides an output to shift pivot operator 168 to the discharge position. Pistons 112, 114 then begin supplying product to the form, fill and seal machine and when empty, trip limit switches LS2 and LS3 to initiate a new cycle.

STOP valve 182, when in the stop position, supplies a pneumatic signal to manually actuatable cleanup valve 214. With the STOP valve 182 manually actuated to the stop position, and with the cleanup valve 214 also manually actuated, air is supplied to cleanout piston cylinder assembly 158 to shift piston rod 164 to the cleanout position.

We claim:

1. A portioning apparatus adapted for coupling to a source of product to be portioned and operable for delivery of selected quantity product portions therefrom, said apparatus comprising:
    a frame assembly presenting a product inlet and a portion outlet;
    at least one portioning assembly including a portioning member for receiving said product, and means to electing a selected quantity product portion from said member;
    means mounting said portioning assembly adjacent said frame assembly for selective movement of said portioning member between a fill position wherein said member communicates with said inlet, and a discharge position wherein said member communicates with said outlet; and
    cleanout apparatus including motive means operably coupled with said frame and portioning assemblies for selective separation of the assemblies upon actuation of the motive means in order to permit cleaning of said member and said inlet and said outlet, said cleanout apparatus including structure for shifting of said portioning assembly relative to said frame assembly, said cleanout apparatus including:
    an elongated shaft fixedly secured to one of said frame assembly and portioning assembly and extending therefrom;
    a piston and cylinder assembly coupled with the other of said frame assembly and portioning assembly and presenting an outwardly extending piston rod; and
    means for selectively coupling said piston rod and shaft for, upon extension of said piston rod, shifting said portioning assembly relative to said frame assembly;
    said portioning assembly comprising a tubular body, said electing means comprising a piston slidable within said body.

2. The portioning apparatus as set forth in claim 1, wherein said tubular body is oriented in an upright direction, said cleanout apparatus shifting structure includes means for vertically raising said portioning assembly relative to said frame assembly, said elongated shaft extending upwardly rom said frame assembly, and said outwardly extending piston rod also extending downwardly, and whereby said piston rod and shaft are coupled for elevating said portioning assembly relative to said frame assembly during downward extension of said piston rod.

* * * * *